J. Gibbons.
Grain Drill.
Nº 1,731. Patented Aug. 25, 1840.
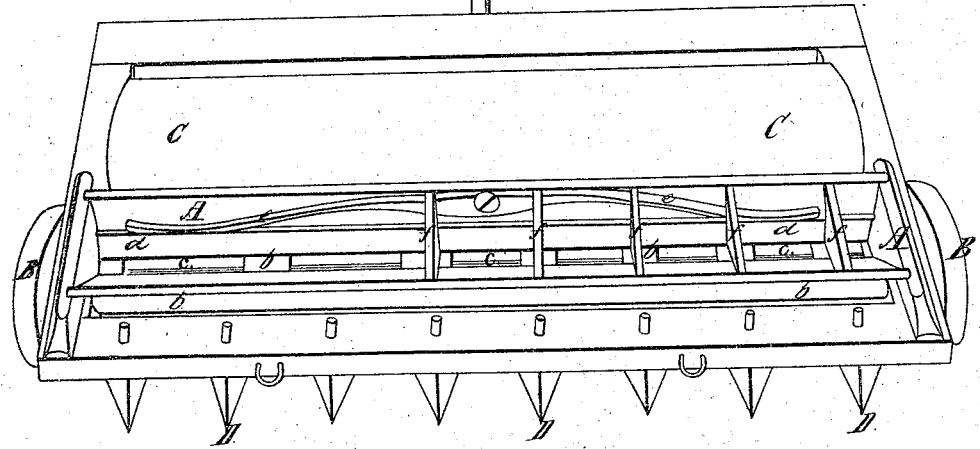
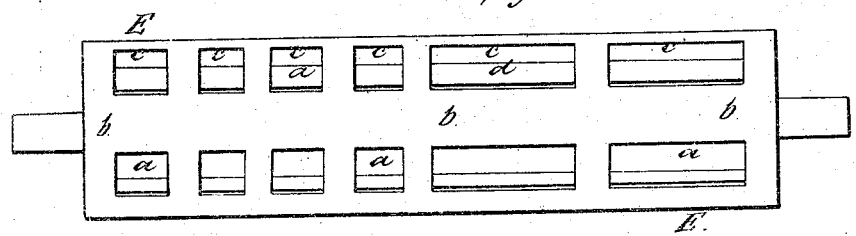
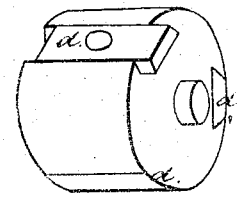
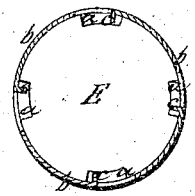

UNITED STATES PATENT OFFICE.

JOSEPH GIBBONS, OF ADRIAN, MICHIGAN.

IMPROVEMENT IN SEED-PLANTERS.

Specification forming part of Letters Patent No. 1,731, dated August 25, 1840.

*To all whom it may concern:*

Be it known that I, JOSEPH GIBBONS, of Adrian, in the county of Lenawee and State of Michigan, have invented a new and useful improvement in the manner of constructing a machine for the planting or sowing of seeds of various kinds; and I do hereby declare that the following is a full and exact description thereof.

In its general construction my machine does not differ from some other machines for the same purpose. The seed to be planted or sown, as well as plaster or other article to be deposited therewith, is put into a hopper, below which a roller revolves, the axis of which crosses the machine, said roller having cavities or excavations on its periphery for the reception of the seed or other article to be deposited. The machine may be made of such width as to deposit several rows or a single row of seeds, as may be desired.

My improvement consists, principally, in the manner in which I determine and regulate the capacity of the cavities in the cylinders for the reception of seed.

Figure 1 in the accompanying drawings is a perspective view of the machine with the cylinder and other apparatus for the sowing or planting of several rows of seed. Fig. 2 is separate view of the cylinder. Fig. 3 is a transverse section of said cylinder.

A A, Fig. 1, is the hopper, which is shown as divided by cross-partitions *f f* into different compartments, which are to be made to correspond with the excavations in the cylinder and the nature of the seed, &c., to be planted or sown. When used for sowing small seed only, such partitions will not be necessary, as its deposition may be regulated by the roller alone. I intend sometimes to put corn or other seed in one division, and plaster-of-paris, lime, ashes, &c., in another alternately, and to conduct them down by means of suitable spouts, so that they may be deposited together.

B B are wheels on the axis of the said cylinder, by the bearing of which wheels upon the ground said cylinder is made to revolve.

C C is a ground-roller, crossing the machine, running upon the ground, and aiding in closing the earth over the seed.

The cylinder E E, Fig. 2, which is placed under the hopper, is made of wood, and has such cavities or excavations *a a a* made in it as shall adapt it to the reception of the seed, &c. I generally inclose this cylinder in a tube, of sheet iron or other metal, fitting closely to its surface, but capable of being turned round on it through this metallic tube or casing. I make perforations corresponding with the cavities in the cylinder, but having a strip of metal on one side of each of the perforations in the tube, which is to be bent down so as to enter the cavities in the cylinder and reach to the bottom thereof. By revolving the tube the requisite distance on the cylinder, the capacities of these cavities may be regulated at pleasure. The cavities in the wood are shown at *a a a*, the metal tube at *b b*, and the part thereof which is bent down into the cavities at C C in the transverse section of this roller, Fig. 3. This arrangement is distinctly shown, the tube being so placed as to lessen the cavities, which are most generally made rectangular. The tube may be secured in place by a pin, wedge, or other known device.

To adapt the lower edge of the back part of the hopper to the planting-cylinder, I place a strip of wood or metal, *d d*, within it, which is borne down by a spring, *e e*, which will produce the necessary bearing of the strip upon the roller along the front edge of the lower part of the hopper. I place a strip of leather, or a brush extending along it, or use some other elastic article to bear upon the surface of the cylinder without impeding its motion, but which will prevent the passing round of seeds not contained within the cavities.

To open the drill for the reception of the seed, I place shares or teeth in suitable situations in front of the machine, as shown at D D D, and I also employ scrapers or other devices for covering the seed, my machine not differing in these particulars from some other planting and sowing machines.

F is a handle by which the machine may be guided, and by the depressing of which its fore part may be raised, the roller C C acting as a fulcrum by its bearing on the ground, by which raising of the front the distribution of the seed will be arrested for any length of time, while the machine may still be allowed to move forward.

Having thus fully described the manner in which I construct my machine for planting and sowing of seeds, &c., what I claim as constituting my invention therein, and desire to secure by Letters Patent, is—

1. The manner in which I regulate the capacity of the cavities made for receiving and conveying the seed to be planted or sown by surrounding the cylinder in which said cavities are made by a tubular casing adapted thereto in the manner described, so that by giving a partial revolution to said casing the cavities may be enlarged or diminished at pleasure.

2. The manner of constructing and using said machine, so that by bearing upon the handle or handles at the back part thereof the roller will operate as a fulcrum, and the distribution of the seed will be arrested.

JOSEPH GIBBONS.

Witnesses:
J. H. CHITTENDEN,
A. L. VAIL.